United States Patent [19]

Rieser et al.

[11] Patent Number: 5,698,758
[45] Date of Patent: Dec. 16, 1997

[54] ALUMINUM PHOSPHATE COMPOSITION WITH HIGH PORE VOLUME AND LARGE PORE DIAMETER, PROCESS FOR ITS PRODUCTION AND USE THEREOF

[75] Inventors: Klaus Rieser, Worms; Christoph Weber, Heidelberg, both of Germany; William Alan Welsh, Highland, Md.

[73] Assignee: W. R. Grace & Co.-Conn., New York, N.Y.

[21] Appl. No.: 446,160

[22] Filed: May 22, 1995

Related U.S. Application Data

[62] Division of Ser. No. 148,143, Nov. 4, 1993, Pat. No. 5,552,361.

[30] Foreign Application Priority Data

Nov. 4, 1992 [DE] Germany .................. 42 37 145.7

[51] Int. Cl.$^6$ .................. C07C 2/08; C08F 2/00; C08F 4/12
[52] U.S. Cl. .................. 585/502; 526/226; 526/233; 502/208
[58] Field of Search .................. 502/208, 355, 502/405, 414; 208/114; 585/820, 502; 526/226, 233; 423/305; 210/660

[56] References Cited

U.S. PATENT DOCUMENTS

| | | | |
|---|---|---|---|
| 3,342,750 | 9/1967 | Kearby | 252/437 |
| 4,080,311 | 3/1978 | Kehl | 502/208 |
| 4,158,621 | 6/1979 | Swift et al. | 208/114 |
| 4,179,358 | 12/1979 | Swift et al. | 208/114 |
| 4,364,842 | 12/1982 | McDaniel et al. | 252/430 |
| 4,444,964 | 4/1984 | McDaniel et al. | 526/105 |
| 4,444,965 | 4/1984 | McDaniel et al. | 526/105 |
| 4,547,479 | 10/1985 | Johnson et al. | 502/155 |
| 4,724,066 | 2/1988 | Kirker et al. | 208/114 |
| 4,769,429 | 9/1988 | Furtek | 526/129 |
| 5,030,431 | 7/1991 | Glemza | 423/305 |
| 5,286,369 | 2/1994 | Roberie et al. | 208/114 |
| 5,292,701 | 3/1994 | Glemza et al. | 502/202 |

FOREIGN PATENT DOCUMENTS

| | | |
|---|---|---|
| 0215336 | 3/1987 | European Pat. Off. . |
| 0515880 | 12/1992 | European Pat. Off. . |
| 0090374 | 10/1993 | European Pat. Off. . |

*Primary Examiner*—Walter D. Griffin
*Attorney, Agent, or Firm*—Robert A. Maggio

[57] ABSTRACT

A homogeneous amorphous aluminum phosphate composition with a surface area of 100 to 300 m$^2$/g and a pore volume in pores with diameters of less than 1000 nm of at least 1.0 cm$^3$/g, in which phosphorus and aluminum are present in a molar ratio in the range from 0.9:1 to 1:1 and which is characterized in that it is present in the form of microspherical particles with a particle size of 10 to 250 μm and displays a bimodal pore-size distribution in the pore-diameter range of less than 1000 nm is suitable as a cracking catalyst, as a catalyst support, especially for polymerization catalysts, as a flatting agent, as an adsorption agent and as a thickening agent.

13 Claims, No Drawings

5,698,758

1

ALUMINUM PHOSPHATE COMPOSITION WITH HIGH PORE VOLUME AND LARGE PORE DIAMETER, PROCESS FOR ITS PRODUCTION AND USE THEREOF

This is a division of application Ser. No. 08/148,143, filed Nov. 4, 1993 now U.S. Pat. No. 5,552,361.

FIELD OF THE INVENTION

The invention relates to a homogeneous amorphous aluminum phosphate composition with a surface area off 100 to 300 m$^2$/g and a pore volume in pores with a diameter of less than 1000 nm of at least 1.0 cm$^3$/g, in which phosphorus and aluminum are present in a molar ratio in the range from 0.9:1 to 1:1, to a process for the production of this aluminum phosphate composition and to the use of this aluminum phosphate composition.

BACKGROUND OF THE INVENTION

The prior art relating to aluminum phosphate and to its production is explained in detail in U.S. Pat. No. 5,030,431. Disclosed in this patent specification is a novel production process with which homogeneous amorphous aluminum phosphate with high pore volume and relatively large pore diameters is successfully produced. The essential feature of the aluminum phosphate known from U.S. Pat. No. 5,030,431 is the combination of high pore volume of at least 1.0 cm$^3$/g and relatively low surface of ca. 200 to 400 m$^2$/g. This means that the average pore diameter is at least 12.5 and preferably at least 15.0 nm. The examples of this patent specification accordingly contain descriptions of aluminum phosphates with a pore diameter of up to 21.3 nm (Example 6).

The aluminum phosphate described in U.S. Pat. No. 5,030,431 is suitable as a cracking catalyst, as a catalyst support, especially for ethylene polymerization catalysts, flatting agent, adsorption agent and thickening agent, and, because of its aforementioned properties, leads to clear improvements in the case of these applications.

It was now surprisingly discovered that the properties of the aluminum phosphate known from U.S. Pat. No. 5,030,431 can be changed through additional process measures, so that the aluminum phosphate displays even further improved properties in relation to the aforementioned applications.

SUMMARY OF THE INVENTION

The subject of the invention is accordingly a homogeneous amorphous aluminum phosphate composition of the type mentioned initially which is characterized in that it is present in the form of microspherical particles with a particle size of 10 to 250 µm and displays a bimodal pore-size distribution in the pore-diameter range of less than 1000 nm.

The subject of the invention is also a process for the production of a homogeneous amorphous aluminum phosphate composition in the form of microspherical particles according to the invention.

Finally, the subject of the invention is the use of the inventive aluminum phosphate composition as a cracking catalyst, as a catalyst support, especially for polymerization catalysts, as a flatting agent, as an adsorption agent and as a thickening agent. The use as polymerization catalyst for the polymerization of ethylene is particularly preferred.

Preferred versions of the invention emerge from the following description and from the subsidiary claims.

2

DETAILED DESCRIPTION OF THE INVENTION

While the aluminum phosphate compositions known from the prior art such as U.S. Pat. No. 5,030,431 display a monomodal pore-volume distribution with pore diameters in the mesopore range, i.e. in the pore-diameter range from 2 to 50 nm, the aluminum phosphate composition according to the invention has a bimodal pore-size distribution in the pore-diameter range of less than 1000 nm, i.e. the pore-size distribution displays maxima in the meso- and macropore diameter ranges (2 to 50 nm and >50 am). Such a bimodal pore-size distribution is desirable and leads, for example upon use of the aluminum phosphate as a support for ethylene polymerization catalysts, to a polymer with an increased melt index.

In the prior art relating to aluminum phosphate, the morphology of the aluminum phosphate particles has received no attention hitherto. It was found according to the invention that microspherical aluminum phosphate particles lead to polymerization catalysts which produce spherical polymer particles. Compared with polymers which have been produced with irregularly shaped catalyst particles, these polymer products have higher bulk densities. Polymers with higher bulk densities can be used without pelletization or extrusion for the further processing steps. The absence of the pelletizing or extrusion step means that polymers with a broader melt-index range can be produced.

The aluminum phosphate composition according to the invention has a combination of properties which makes it particularly suitable for the aforementioned uses. Thus, it is present in the form of microspherical particles with a particle size of 10 to 250 µm, preferably 30 to 70 µm and in particular ca. 50 µm. The pore volume is at least 1.0 cm$^3$/g and preferably at least 1.3 cm$^3$/g. The pore volume in pores with diameters of less than 60 nm is preferably at least 0.5 cm$^3$/g. The pore volume in pores with diameters in the range from 60 to 1000 nm is preferably at least 0.2 cm$^3$/g. The surface area of the aluminum phosphate composition according to the invention lies in the range from 100 to 300 m$^2$/g and preferably in the range from 100 to 200 m$^2$/g. The maxima of the bimodal pore-size distribution preferably lie in the pore-diameter range from 10 to 20 nm and 100 to 200 nm.

Production of the aluminum phosphate composition according to the invention takes place in the manner known from U.S. Pat. No. 5,030,431, but with additional process steps. For the sake of simplicity, reference is thus made to the disclosure in U.S. Pat. No. 5,030,431. However, it should be pointed out that the process described in U.S. Pat. No. 5,030,431 can be modified in respect of the neutralization steps. Thus, in the first neutralization step, the base, in particular ammonium hydroxide, can also be added rapidly until hydrogel formation sets in. The addition of the base can also take place in the form of ammonia gas. Further, the second neutralization step can be carried out in such a way that the hydrogel is treated for ca. 10 to 30 seconds at a temperature of ca. 60° to 90° C. with a concentrated aqueous base solution. Although it is possible to shorten the second neutralization stage, the treatment period should be at least two hours and preferably at least four hours. Finally, the washing can take place following the second neutralization stage with water if the second neutralization stage has been carried out at an increased temperature of ca. 60° to 90° C. and in particular ca. 85° C.

According to the modification which has been discussed of the neutralization stages of the process described in U.S.

Pat. No. 5,030,431, a preferred version of the production process comprises the following procedure. The hydrogel is produced by partly neutralizing the acid aqueous solution and leaving the partly neutralized composition to gel. A ca. 60 to 70% neutralization is preferred. The pH value of the partly neutralized composition is not critical, but should be kept low enough to avoid a precipitation. The quantity of base used in this stage is calculated with reference to the stoichiometry of the reaction. 100% neutralization means that all of the nitrate is converted to $NH_4NO_3$, which has a pH value of 3.5 to 4.5 in water. The pH value in the case of 100% neutralization is thus ca. 4.0.

Gaseous ammonia is suitable for the neutralization. The ammonia gas is added to the aqueous aluminum phosphate solution, accompanied by adequate thorough mixing, in order to achieve a uniform mixing of the reactants. The ammonia gas can bubble through the solution or be injected into the solution, at a rate at which the ammonia gas can be absorbed by the liquid, i.e. the ammonia gas does not simply bubble against the surface or expel the liquid. The rate of addition depends on the system in question and on the devices used. The determination of the suitable rate of feed is not a problem for the specialist and can easily be ascertained by means of a few tests. Thus, it was found for example that ca. 60 to 70 l of ammonia gas can be added to ca. 1 l of solution at a rate of ca. 5 to 6 l per minute, the bubbles disappearing in the liquid at this rate of feed.

With a ca. 2/3 neutralization, the mixture gels. The partly neutralized solution is then present in the form of a viscous mass and forms a clear homogeneous hydrogel which is solid enough for further processing in the succeeding process stages. A large amount of heat is released during the neutralization, as a result of which the temperature of the gel rises (e.g. to ca. 80° C. in a non-insulated vessel). The gelled mass is a semi-solid material which breaks like glass upon application of small shearing forces, but flows like a plastic liquid when higher shearing forces are applied. The degree of plasticity is variable.

The resultant aluminum phosphate hydrogel is then subjected to a second neutralization treatment. The hydrogel, which can be reduced to lumps or pieces for easier handling, is treated with an aqueous basic solution. The basic solution must have a sufficient volume to cover the hydrogel and be strong enough to produce a final pH value of ca. 8.0 to 9.0. Ammonium hydroxide is preferred, although sodium hydroxide can also be used. If sodium hydroxide is used, ensure that residual sodium is washed out.

The hydrogel is preferably treated with a concentrated base such as ammonium hydroxide. This treatment leads to neutralization, the hydrogel remaining intact. It is preferred to use concentrated ammonium hydroxide (pH 10.0) at ca. 60.0° to 90.0° C. and preferably ca. 80.0° C. In a preferred version, for example, the following materials and proportions by quantity can be used: for every part by weight of gel, one part by weight of deionized water is heated to ca. 80° C. (to accelerate the process) and mixed with ca. 0.09 parts by weight of concentrated ammonium hydroxide solution (ca. 29 wt.-%). A solution with a smaller ammonia content can also be used, but it is preferred that a surplus of ammonia over and above the quantity needed for neutralization is present.

Typically, only a small thorough mixing is necessary in the case of this second neutralization stage, assuming that temperatures of ca. 60° to 90° C. and preferably 80° to 85° C. are achieved and the gel is exposed to the base in an appropriate manner. Thus, it is sufficient for example to pass through a gas or rotate the vessel. The hydrogel should be treated for at least ca. 2 hours and preferably at least ca. 4 hours.

As in the case of the wash described in U.S. Pat. No. 5,030,431 with a hot dilute base solution, this treatment with a hot base also strengthens the hydrogel structure and maximizes the porosity of the aluminum phosphate composition upon removal of water. Accordingly, this modified mode of production also leads to a homogeneous hydrogel with good pore volume in the initial gel structure, the potential pore volume being maintained essentially through the treatment with a hot base.

Ammonium nitrate which has remained behind is removed by washing with water. Deionized water whose pH value is set at ca. 10 with ammonium hydroxide is used for preference. This pH value setting is not absolutely necessary, however. Washing can be either continuous or discontinuous. Mixing is preferably restricted to avoid the formation of fine-particled grindings. As already mentioned above, washing with water is also possible with the procedure according to U.S. Pat. No. 5,030,431.

In the case of the described production method with modified neutralization, a calcination is recommended in order to free the solid aluminum phosphate composition of residual alcohol and ammonium nitrate. It is assumed that the removal of these residues maximizes the pore volume. Calcination is also possible, if at all desired, with the production method according to U.S. Pat. No. 5,030,431. A calcination is recommended, for example, if the aluminum phosphate composition is to be used as a cracking catalyst. With the production method according to U.S. Pat. No. 5,030,431, however, a calcination is often not necessary, because the residues are more thoroughly washed out with this procedure.

If a calcination is carried out, time and temperature are to be chosen in such a way that the nitrates which have remained behind are removed to an adequate extent. For example, the composition can be calcined for 1 hour at 538° C., although other times and temperatures can be used.

The exchanged, dried or calcined hydrogel which is thus obtained is ground according to the invention, mechanically (for example in a ball mill) or with a jet mill, to a particle size of less than 10 µm. This can take place in one or more grinding stages. The particle size of the ground hydrogel is determined using the laser-diffraction method described by Heuer and Leschonsky, Part. Charact. 2, 7 (1985). An automatic Malvern instrument of the Mastersizer type was used for the measurements.

In the next process stage, the ground gel is suspended in water, accompanied by formation of a slurry with a solids content of 10 to 30 wt.-%. This process stage is combined with the grinding stage in practice, i.e. enough water is already added prior to grinding and the resultant slurry is then subjected to the milling process.

The pH value of the slurry which is to be spray-dried is to be 3 to 7. Accordingly, the pH value is set to this pH value, if necessary, through addition of an acid or base. The slurry is then spray-dried, the conditions being so chosen that the particle size of the resultant microspherical particles is 10 to 250 µm, preferably 30 to 70 µm and in particular ca. 50 µm. The conditions necessary for this are known to the specialist or can be ascertained through a few routine tests. This also includes the desired degree of drying which usually lies in the end-product in the case of a water content of less than 10 wt.-%.

The particle size of the end-product is determined according to the electric sensing zone method described by Alex et al., Chemie Ing. Techn. 46, 477 (1974). The measurements were performed with a Coulter Electronics automatic instrument of the Coulter Counter TA II type, using an aperture size of 560 µm.

If desired, the thus-obtained end-product can be subjected to a calcination in order to remove volatile constituents which are still present (cf. also U.S. Pat. No. 5,030,431 in this connection).

The aluminum phosphate composition according to the invention has a broad bimodal pore-size distribution which covers the micro-, meso- and macropore ranges. As there is no procedure for determining the pore volume over the whole pore-size range, two procedures have been used. The pore volume in pores with diameters from 1.4 to 60 nm was ascertained using the procedure described by Lard and Brown, J. Catal., Volume 25, 451 (1972). The nitrogen adsorption isotherms were produced with the help of an automatic Micrometrics instrument of the ASAP 2400 type. The mercury pore volume in the pore range with diameters from 60 to 1000 nm was ascertained using the procedure described by Joyner et al., J. Am. Chem. Soc. 73, 3155 (1951) and Hustings and Scholten, Adsorpt. Sci. Technol. 4, 241 (1987). The measurements were carried out with an automatic Micrometrics instrument of the Autopore 9200 type. The bimodal pore-size distribution results qualitatively from the mercury penetration curves.

The surface area was determined in known manner according to Brunauer-Emmett-Teller (J. Am. Chem. Soc. 60, 309 (1938)). The nitrogen adsorption isotherms were measured with the help of an automatic Micrometrics instrument of the ASAP 2400 type.

The grinding according to the invention of the dried aluminum phosphate hydrogel leads to a further reduction in the surface. This effect can be further increased by using aluminum hydroxychloride $Al_2(OH)_5Cl$ (chlorohydrol) as aluminum source. The advantageous bimodal pore-volume or pore diameter distribution of the aluminum phosphate composition according to the invention comes about because larger secondary particles with an additional pore structure are formed from the small primary particles during the spray-drying. Like the primary particles, the thus-formed secondary particles have also proved to be thermally stable (cf. again U.S. Pat. No. 5,030,431), which is an essential precondition for the advantageous application of the aluminum phosphate composition according to the invention. Overall, the aluminum phosphate composition according to the invention has a surface which is further reduced and even greater pore diameters compared with the prior art, the pore-diameter distribution being bimodal. Finally, the microspherical shape of the aluminum phosphate composition according to the invention has a favourable effect on the physical properties (for example, reduced wear during use as a catalyst). In the case of use as a support for polymerization processes in particular, the spherical shape of the aluminum phosphate composition according to the invention is of advantage, as the particle shape of the polymer product depends on the particle shape of the catalyst and, when spherical catalyst particles are used, spherical polymer particles are also obtained which result in a product of greater bulk density.

When the aluminum phosphate composition according to the invention is used as a support for polymerization catalysts, it is necessary to combine the aluminum phosphate composition with a catalytically active agent. This also takes place in the manner described in U.S. Pat. No. 5,030,431. In addition to chromium, which can be added for example in the form of chromium (VI) oxide, chromium (IV) oxychloride, chromium (III) bromide, chromium (III) chloride, chromium (III) fluoride, chromium (III) iodide, chromium (III) acetate, chromium (III) phosphate, chromium (III) sulphate, chromium (III) nitrate and chromium (III) acetyl acetonate, other promoters such as boron, silicon or titanium can be introduced.

The invention is described in more detail below with reference to examples.

The products obtained underwent scanning electron microscope study with a Model 840 Jeol scanning electron microscope. The volatile components were determined through one hour's calcination of the samples at 950° C. in a muffle furnace. Phosphorus and aluminum were determined, after decomposition of the samples in concentrated hydrochloric acid (32 wt.-%), by inductively coupled plasma atom emission spectroscopy, using a Model 3580 ARL instrument.

EXAMPLE 1

1604.4 g of $Al(NO_3)\times 9H_2O$ and 189.0 g of water were placed in a beaker and heated to ca. 80° C. After the aluminum nitrate had gone completely into solution, 483.0 g of $NH_4H_2PO_4$ were added, accompanied by stirring, and dissolved therein. The solution was left to cool to ambient temperature. The calculated molar P/Al ratio was 0.98.

538.6 g of the cooled solution were then placed in a Warren mixer. 124.0 ml of concentrated aqueous ammonia (30wt.-%) were slowly added, accompanied by intensive thorough mixing (over a period of 39 minutes). The resultant viscous mass was transferred into a beaker and left to gel overnight. The calculated percentage neutralization (to $NH_4NO_3$) was 96.0% and the final solids content, calculated as $AlPO_4$, was 18.8 wt.-%.

The thus-obtained aluminum phosphate hydrogel was reduced to lumps measuring ca. 2.5 cm. 515 g of these lumps were transferred into another beaker, covered with an aqueous solution which contained 65 ml of concentrated aqueous ammonia (30 wt.-%), and left to stand overnight. The steeping solution (final pH value 8.5) was decanted and the hydrogel was transferred into another vessel for the subsequent wash treatment.

The hydrogel was washed for 19 hours in a continuous throughflow system with 85° C. warm diluted aqueous ammonia solution (pH 10.0). The washed hydrogel was then subjected to 7 exchange treatments with acetone and dried overnight in a vacuum oven at 145° C. The dried product had a pore volume of 1.43 cm$^3$/g and a surface area of 380.0 m$^2$/g. The volatile constituents content was 12.3 wt.-%.

The above procedure was repeated 5 times in order to produce some 1.5 kg of aluminum phosphate gel in all.

1 kg of the aluminum phosphate gel was placed in a Rietz mill. 3 l of deionized water were added, so that a 25 wt.-% slurry was obtained which was milled through a 0.4 mm screen. The thus-obtained slurry was diluted with 880 ml of deionized water and 120 ml of dilute ammonia (12.5 wt.-%) in order to adjust the solids content of the slurry to 20 wt.-% and the pH value of the slurry to 4.2. This slurry was fed into a Premier ball mill which was 85% filled with 1.5 mm zirconium spheres. The rate of feed was 800 ml/min. The Premier ball mill was operated at 1500 rpm. The particle-size distribution (Malvern) of the thus-obtained slurry was: $d_{10}$=2.5 µm, $d_{50}$=4.8 µm, $d_{90}$=11.5 µm.

The thus-obtained slurry was spray-dried with the help of a Bowen BE1434 spray-drying device. The operating conditions were as follows: nozzle diameter 2 cm, atomization pressure 0.5 bar, inlet/outlet temperatures 370°/160° C.

500 g of the spray-dried product were manually sieved through a 0.18 mm screen. Scanning electron microscope analysis showed that non-agglomerated aluminum phosphate microspheres were present. The end-product had the following properties:

Molar ratio P/Al=0.96
Surface area (m$^2$/g)=108
N$_2$ pore volume (cm$^3$/g)=0.59
Hg pore volume (cm$^3$/g)=0.61
d$_z$ (µm) (ave. particle size)=39.6

EXAMPLE 2

Example 1 was repeated, with the following differences.

The starting solution was prepared using 1200.0 g of Al(NO$_3$)$_3$×9H$_2$O, 57.6 g of Cr (NO$_3$)×9H$_2$O, 331.3 g of NH$_4$H$_2$PO$_4$ and 192.0 g of water. The calculated P/Al molar ratio was 0.90 and the calculated P/Al+Cr) molar ratio was 0.86.

In the first neutralization stage, 556.5 g of solution were used and 133.5 ml of concentrated ammonia were added over a period of 44 minutes. The calculated neutralization percentage was 95.0% and the calculated final solids content was 17.5 wt.-%.

In the second neutralization stage, 566.5 g of hydrogel lumps were covered with an aqueous solution which contained 70 ml of concentrated ammonia. The final pH value of the steeping solution was 8.2.

The washing duration was 21 hours. The washed hydrogel was subjected to 8 exchange treatments with ethanol. The subsequent drying in a vacuum oven lasted for 19 hours at a temperature of 114° C.

Grinding took place as described in Example 1 and produced the following particle-size distribution: d$_{10}$=2.8 µm, d$_{50}$=5.5 µm, d$_{90}$=12.5 µm.

Spray-drying and manual sieving likewise took place as described in Example 1. Scanning electron microscope analysis again showed non-agglomerated microspherical particles. The end-product had the following properties:

Molar ratio P/Al=0.90
Cr (wt.-%)=2.2
Surface area (m$^2$/g)=172
N$_2$ pore volume (cm$^3$/g)=0.78
Hg pore volume (cm$^3$/g)=0.56
d$_z$ (µm) (ave. particle size)=54.7

EXAMPLE 3

Example 1 was repeated, with the following differences.

The starting solution was prepared using 1200.0 g of Al(NO$_3$)$_3$×9H$_2$O, 331.3 g of NH$_4$H$_2$PO$_4$ and 192.0 g of water. The calculated P/Al molar ratio was 0.90.

In the first neutralization stage, 556.5 g of solution were used and 133.5 ml of concentrated ammonia were added over a period of 44 minutes. The calculated neutralization percentage was 95.0% and the calculated final solids content was 17.5 wt.-%.

In the second neutralization stage, 566.5 g of hydrogel lumps were covered with an aqueous solution which contained 70 ml of concentrated ammonia. The final pH value of the steeping solution was 8.2.

The washing duration was 21 hours. The washed hydrogel was subjected to 8 exchange treatments with ethanol. The subsequent drying in a vacuum oven lasted for 19 hours at a temperature of 114° C.

Grinding took place as described in Example 1, with the difference that 160 g of chromium nitrate (Cr(NO$_3$)×9H$_2$O) were also added to the slurry obtained after the milling in the Rietz mill. The following particle-size distribution resulted: d$_{10}$=2.2 µm, d$_{50}$=4.3 µm, d$_{90}$=10.7 µm.

Spray-drying and manual sieving likewise took place as described in Example 1. Here, too, scanning electron microscope analysis showed non-agglomerated microspherical particles. The end-product had the following properties:

Molar ratio P/Al=0.90
Cr (wt.-%)=1.0
Surface area (m$^2$/g)=172
N$_2$ pore volume (cm$^3$/g)=0.78
Hg pore volume (cm$^3$/g)=0.24
d$_z$ (µm) (ave. particle size)=51.2

We claim:

1. A method of using a homogeneous amorphous aluminum phopsphate composition as a polymerization catalyst support, the method comprising combining the aluminum phosphate composition with an agent which is catalytically active in ethylene polymerization and polymerizing ethylene in the presence thereof, the aluminum phosphate composition further having a surface area of 100 to 300 m$^2$/g and a pore volume in pores with diameters of less than 1000 nm of at least 1.0 cm$^3$/g, in which phosphorus and aluminum are present in a molar ratio in the range from 0.9:1 to 1:1, characterized in that it is present in the form of microspherical particles with a particle size of 10 to 250 µm and displays a bimodal pore-size distribution in the pore-diameter range of less than 1000 nm.

2. The method of use according to claim 1, wherein the aluminum phosphate composition has a maxima of the bimodal pore-size distribution in the pore-diameter range from 10 to 20 nm and 100 to 200 nm.

3. The method of use according to claim 2, wherein the aluminum phosphate composition has a pore volume of at least 0.5 cm$^3$/g in pores with diameters of less than 60 nm.

4. The method of use according to claim 2, wherein the aluminum phosphate composition has a pore volume of at least 0.2 cm$^3$/g in pores with diameters in the range from 60 nm to 1000 nm.

5. The method of use according to claim 4, wherein the aluminum phosphate composition is present in the form of microspherical particles having a size of 30 to 70 µm.

6. The method of use according to claim 1 wherein the catalytically active agent comprises chromium.

7. A method of using a homogeneous amorphous aluminum phosphate composition in the form of microspherical particles produced from a process comprising a) preparing an acid aqueous solution of one or more aluminum salts and one or more phosphate salts, the solution displaying a molar P/Al ratio of 0.9:1 to 1:1, b) partially neutralizing the solution of step a) by intensive thorough mixing with a base, the pH value of the partially neutralized solution preferably being less than 5.0, c) permitting the partially neutralized solution of step b) to gel, d) treating the gel from step c) for 10 to 30 hours with an aqueous basic solution and then washing it with a base solution at a temperature of about 60° to 90° C., e) subjecting the washed gel to one or more exchange treatments with alcohol, acetone or ethyl acetate and f) drying the exchanged gel to the desired volatile constituents content, characterized in that g) the dried gel is ground, mechanically or with a jet mill, to a particle size of less than 10 μm, h) the milled gel is suspended in water, accompanied by formation of a slurry with a solids content of 10 to 30 wt.-%, i) the pH value of the slurry is set at 3 to 7 by addition of an acid or base and j) the slurry is spray-dried to produce microspherical particles of aluminum phosphate, wherein the resulting particles are used as a catalyst support and the method of using the particles comprises combining the particles with an agent which is catalytically active in ethylene polymerization and polymerizing ethylene in the presence thereof.

8. The method of use according to claim 7, wherein the solution from step a) is neutralized in step b), accompanied by mixing, through rapid addition of ammonia gas or ammonium hydroxide until gel has formed, the formed gel further treated for at least 2 hours at about 60° to 90° C. with a concentrated aqueous basic solution, and then washed with water and the process is then continued with the exchange treatment according to step e).

9. The method of use according to claim 8 wherein steps g) and h) are combined by mixing the dried gel, prior to grinding, with water.

10. The method of use according to claim 9 wherein the dried gel from step f) is calcined.

11. The method of use according to claim 7 wherein the catalytically active agent comprises chromium.

12. The method of use according to claim 7 wherein the base in step b) is slowly added.

13. The method of use according to claim 8 wherein the gel is treated for at least four hours with a concentrated aqueous basic solution.

* * * * *